United States Patent
Ely et al.

(10) Patent No.: US 7,336,510 B2
(45) Date of Patent: *Feb. 26, 2008

(54) METHOD AND SYSTEM FOR INCREASING LOAD START-UP CAPABILITY OF A DC-TO-AC CONVERTER

(75) Inventors: Jeffrey A. Ely, Kokomo, IN (US); Brian J. Denta, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 399 days.

This patent is subject to a terminal disclaimer.

(21) Appl. No.: 11/088,100

(22) Filed: Mar. 23, 2005

(65) Prior Publication Data

US 2006/0215426 A1    Sep. 28, 2006

(51) Int. Cl.
 *H02M 7/537* (2006.01)
(52) U.S. Cl. .......................................... 363/49; 363/131
(58) Field of Classification Search ................. 363/16, 363/40, 41, 49, 131, 132
See application file for complete search history.

(56) References Cited

U.S. PATENT DOCUMENTS

| 5,343,379 | A | * | 8/1994 | Kirchberg et al. | ............ 363/41 |
| 5,438,502 | A | * | 8/1995 | Rozman et al. | ............... 363/35 |
| 5,631,819 | A | * | 5/1997 | Masaki et al. | ............... 363/132 |
| 5,949,663 | A | * | 9/1999 | Endo et al. | .................... 363/37 |
| 7,218,539 | B2 | * | 5/2007 | Ely et al. | .................... 363/131 |

FOREIGN PATENT DOCUMENTS

EP       1705790 A2 *  9/2006

* cited by examiner

*Primary Examiner*—Adolf Berhane
(74) *Attorney, Agent, or Firm*—Jimmy L. Funke

(57) ABSTRACT

A power system for increasing a load start-up capability of a DC/AC converter includes a DC/AC converter, a processor coupled to the DC/AC converter and a memory subsystem coupled to the processor. The memory subsystem stores code that when executed by the processor instructs the processor to perform a number of steps. When an actual link voltage of a DC/AC converter falls below a predetermined link voltage level, when a commanded link voltage is set for a nominal link voltage level, the commanded link voltage is increased to link voltage level that is greater than the nominal link voltage level. The DC/AC converter is then restarted.

20 Claims, 2 Drawing Sheets

METHOD AND SYSTEM FOR INCREASING LOAD START-UP CAPABILITY OF A DC-TO-AC CONVERTER

TECHNICAL FIELD

The present invention is generally directed to a DC-to-AC converter and, more specifically, to increasing load start-up capability of a DC-to-AC converter that provides a sinusoidal output.

BACKGROUND OF THE INVENTION

Commercially available DC-to-AC (DC/AC) converters, e.g., 12 Volt DC to 120 Volt AC, 60 Hz converters, frequently have difficulty starting various electrical devices, e.g., televisions, motors, etc., that draw heavy currents when the devices are first powered up. In general, when heavy start-up loads are applied, the converter DC link voltage may be loaded excessively and fall below a required value. This low link voltage, in turn, results in waveform distortion at the output of the DC/AC converter, which may result in suboptimal load starting performance. In commercially available DC/AC converters, when the link voltage of the converter falls during a high load situation, peak clipping of the output waveform of the converter usually results. Converters that are designed to maintain a root-mean square (RMS) voltage or average voltage typically respond to the falling peak voltage by increasing a gain factor to boost the non-peak portion of the waveform in an attempt to maintain the desired RMS voltage.

Unfortunately, the dV/dt (rise-time) of converters operated in this manner usually becomes abnormally high, which can cause problems for some types of loads, such as those that rectify alternating current (AC) and charge a capacitor. In addition, such converters may create significant harmonic content in the output waveform, which can be problematic for magnetic devices, such as transformers and motors. Typical DC/AC converters have used a DC-to-DC (DC/DC) converter to boost a system voltage, e.g., 14 Volts DC, to a voltage above the peak of a desired sinusoidal output voltage, e.g., 170 Volts for a 120 Volt AC system. In such DC/AC converters, while an associated inverter is generally capable of delivering more power than its continuous rating for a brief period of time, subject to thermal limitations, the DC/DC converter is often not capable of sustaining the desired link voltage with the increased power delivery. Consequently, such DC/AC converters have required that the DC/DC converter be oversized in order to start an associated load. Unfortunately, oversizing the DC/DC converter increases the overall cost of the DC/AC converter, which is undesirable.

What is needed is a technique for temporarily increasing the power capability of a DC/AC converter to better allow the converter to start certain loads.

SUMMARY OF THE INVENTION

The present invention is generally directed to a method and power system for increasing a load start-up capability of a DC/AC converter. In one embodiment of the present invention, the power system includes a DC/AC converter and a decision circuit coupled to the DC/AC converter. The decision circuit may take the form of an analog circuit or may take the form of a processor, with an associated memory subsystem, that is programmed to perform the functions described below. In any case, the decision circuit performs a number of steps, when implementing the present invention. One step includes determining when an actual link voltage falls below a predetermined link voltage level, when a commanded link voltage of the DC/AC converter is set for a nominal link voltage level. When the actual link voltage falls below the predetermined link voltage level, the commanded link voltage of the DC/AC converter is increased to a higher level, e.g., for a predetermined time period after restarting of the DC/AC converter.

The restarting of the DC/AC converter may include the step of restarting a DC/DC converter (of the DC/AC converter) and/or restarting a DC/AC output inverter (of the DC/AC converter). According to another aspect of the present invention, the commanded link voltage is decreased to the nominal link voltage level after a predetermined time period. According to a different aspect of the present invention, the commanded link voltage is increased to a link voltage level that is greater in magnitude than the nominal link voltage level for a predetermined time period when the actual link voltage of the DC/AC converter falls below the predetermined link voltage level.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

The present invention is generally directed to true sinewave converters and other converters where a low-pass filter is used to smooth an output of an inverter that modulates power flow at a frequency that is generally well above a desired AC output frequency. By temporarily increasing a link voltage of the DC/AC converter, many hard to start loads, e.g., those that have a start-up impulse that is around 100 mS, can be started without requiring that the entire converter be designed to continually operate at peak power requirements.

Figure 1:
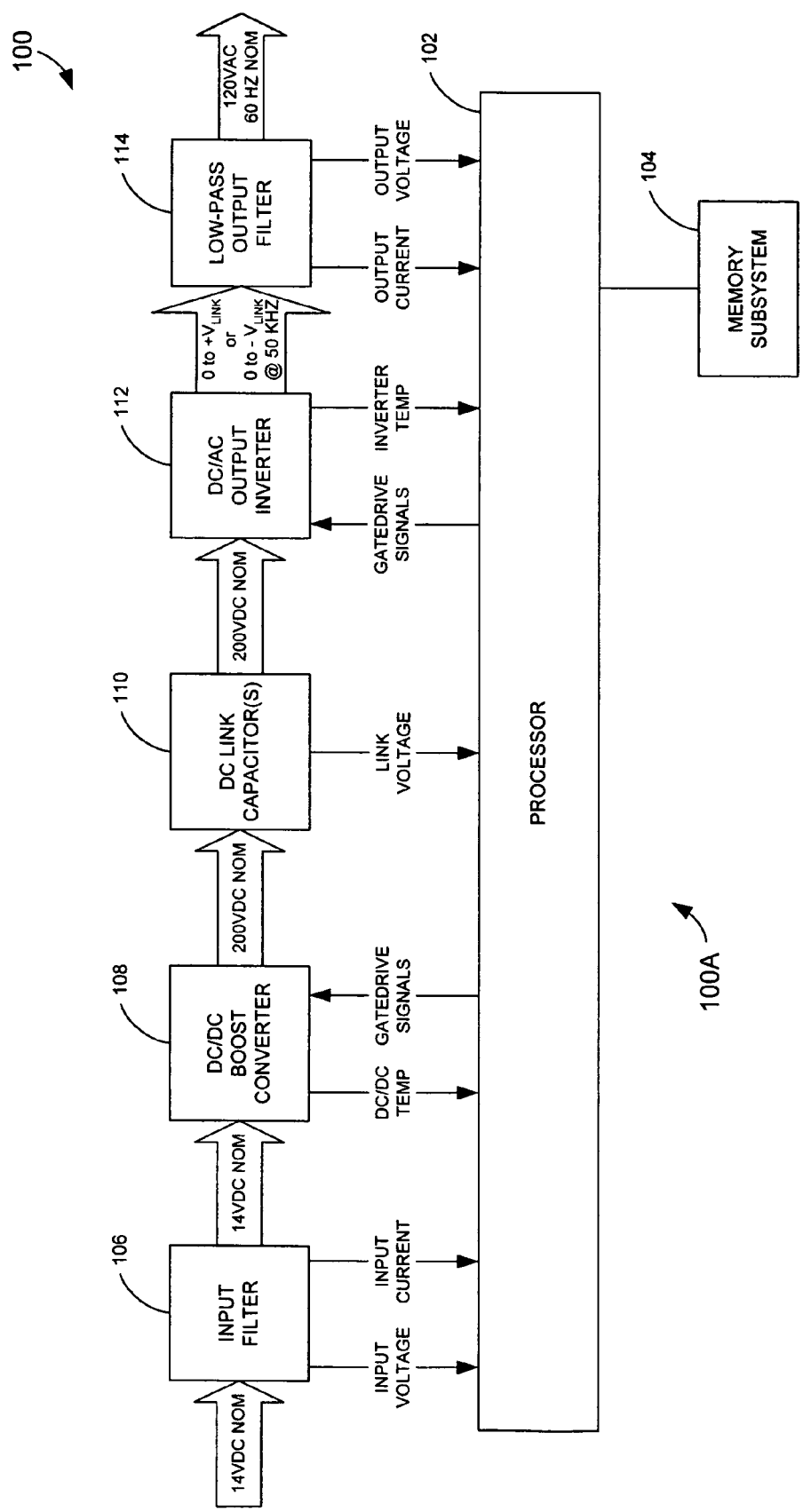
FIG. 1 is an exemplary electrical block diagram of an exemplary DC/AC converter constructed according to one embodiment of the present invention.

With reference to FIG. 1, a block diagram of an exemplary power system 100A that includes a DC/AC converter 100 is illustrated. As is shown, the converter 100 includes an input filter 106 that receives a DC voltage, e.g., 14 VDC, from a battery that is coupled to the input of the filter 106, whose output is coupled to an input of a DC/DC boost converter 108. An output of the DC/DC boost converter 108 is coupled to an input of a DC link capacitor(s) 110, whose output is coupled to a DC/AC output inverter 112. The boost converter 108 boosts the input voltage to a higher level, e.g., from 14 VDC to 200 VDC. An output of the DC/AC inverter 112 is coupled to an input of a low-pass output filter 114, which optimally provides at its output a nominal 120 Volt RMS, 60 Hz or 50 Hz (Europe) sinusoidal waveform. In a typical converter, the inverter 112 may provide a 50 KHz pulse width modulated (PWM) output that transitions between zero and a positive link voltage level or zero and a negative link voltage level. Alternatively, the inverter 112 may provide outputs of other frequencies that may be filtered to a 60 Hz or 50 Hz sinusoidal waveform.

A processor 102 is coupled to the input filter 106, the DC/DC boost converter 108, the DC link capacitor(s) 110, the DC/AC output inverter 112 and the low-pass output filter 114. As used herein, the term processor may include a general purpose processor, a microcontroller (i.e., an execution unit with memory, etc., integrated within a single integrated circuit), an application specific integrated circuit (ASIC), a programmable logic device (PLD) or a digital signal processor (DSP). The processor 102 is also coupled to a memory subsystem 104, which includes an application appropriate amount of volatile and non-volatile memory. The processor 102 runs various routines that allow it to monitor the input voltage and current at the input filter 106. The processor 102 provides gate drive signals to the converter 108, which cause the output of the converter 108 to transition (or attempt to transition) to a desired voltage.

The processor 102 monitors the link voltage across the DC link capacitor(s) 110 and is also programmed to provide gate drive signals to the inverter 112, such that the inverter 112 provides an appropriate output signal at its output, e.g., a 50 KHz pulse width modulated (PWM) output that transitions between zero and a positive link voltage level or zero and a negative link voltage level or other appropriate PWM signal. The processor 102 also monitors the output current and voltage at the low-pass output filter 114. Alternatively, as is mentioned above, an analog circuit may be implemented to act as a decision circuit and perform the functions of the programmed processor. For example, a comparator could be implemented to sense a low link voltage and trigger analog timers for shut-down, link boost and recovery delay and a restart timer may be implemented to modify a link voltage setpoint.

As previously mentioned, the processor 102 is programmed to temporarily, e.g., for twenty seconds after restarting the DC/AC output inverter 112, increase the power capability of the DC/AC converter 100 by executing a routine that performs a number of steps. One step includes determining when a link voltage of the DC/AC converter 100 falls below a predetermined link voltage level, e.g., 180 VDC, i.e., when the DC/AC converter 100 has shutdown to occur due to an overload. The processor 102 then controls the DC/DC boost converter 108 (of the DC/AC converter 100) to temporarily increase the voltage level at its output, before restarting the converter 108 and the inverter 112.

For example, a 400 Watt converter might have a normal link voltage of 200 Volts and link capacitance of 2000 uF. If the DC/DC converter 108 is only capable of providing 400 Watts, the link voltage will fall (causing the AC output voltage to distort and fall) when the start-up load exceeds 400 Watts. If the capacitor(s) 110 are pre-charged to 300 VDC, after a converter overload shutdown, there is an additional 50 Joules of energy stored on the link capacitor(s) 110. This stored energy allows the converter 100 to supply an additional 500 Watts for 100 mS before the link voltage is drawn below 200 Volts. After a predetermined time period, the link voltage returns to its normal value in order to operate at better efficiency and to reduce voltage stress on various components. Even when the DC/DC converter is capable of much higher short-term power delivery, e.g., 800 Watts, providing an energy reserve for hard-starting loads according to the present invention can be used to further extend the converter starting capability, e.g., an additional 500 Watts.

Figure 2:
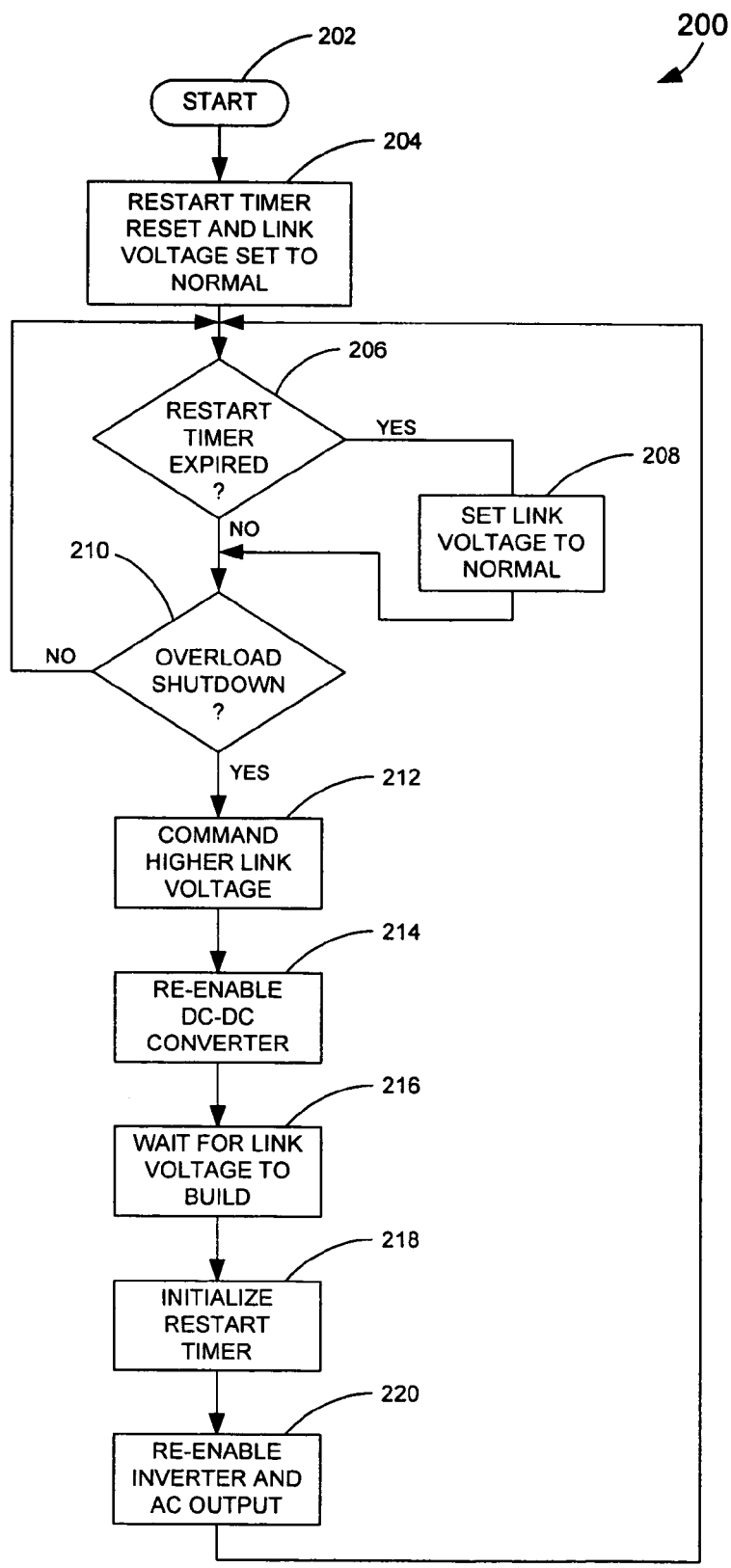
FIG. 2 is a flow diagram of an exemplary DC/AC converter restart routine according to one aspect of the present invention.

With reference to FIG. 2, a flow chart for an exemplary DC/AC converter restart routine 200 is shown. The routine 200 is initiated in step 202, at which point control transfers to step 204, where a restart timer is reset and a link voltage of the DC/AC converter 100 is set to a nominal link voltage level (i.e., a normal level). Next, in decision step 206, the processor 102 (or decision circuit) determines whether the restart timer is expired. If the restart timer has not expired in step 206, control transfers to decision step 210. If the restart timer has expired in step 206, control transfers from step 206 to step 208, where the processor sets (or resets) the link voltage to the normal level. Control then transfers from step 208 to step 210.

In step 210 the processor 102 determines whether an overload shutdown of the DC/AC converter 100 has occurred, i.e., whether the link voltage of the converter 100 has fallen below a predetermined link voltage level, e.g., 180 VDC, which may provide an indication as to whether the load has started. If the link voltage is above the predetermined link voltage level in step 210, i.e., the DC/AC converter 100 has not had an overload shutdown, control returns to step 206. Otherwise, control transfers from step 210 to step 212, where the processor 102 controls (commands) the DC/DC boost converter 108, via gate drive signals, to increase the link voltage provided on the DC link capacitor(s) 110. Then, in step 214, the DC/DC converter 108 is restarted. Next, in step 216, the processor 102 implements a wait state to allow the link voltage to build. Then, in step 218, the processor 102 initializes the restart timer. Next, in step 220, the processor 102 restarts (re-enables) the DC/AC output inverter 112, before returning control to step 206.

Accordingly, a method and system have been described herein for increasing the start-up capability of a DC/AC converter. It should be appreciated that a DC/AC converter designed according to the present invention provides additional start-up power for a limited period of time without requiring that the entire converter be oversized. Advantageously, a DC/AC converter designed according to the present invention can readily be implemented in an automotive environment to allow a motor vehicle to provide power to electrical devices that operate on alternating current (AC).

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method for increasing a start-up capability of a DC/AC converter, comprising the steps of:
   determining when an actual link voltage of a DC/AC converter falls below a predetermined link voltage level when a commanded link voltage is set for a nominal link voltage level;
   increasing the commanded link voltage to an increased link voltage level that is greater than the nominal link voltage level when the actual link voltage of the DC/AC converter falls below the predetermined link voltage; and
   restarting the DC/AC converter.

2. The method of claim 1, wherein the step of restarting the DC/AC converter further comprises the step of:
   restarting a DC/DC converter of the DC/AC converter.

3. The method of claim 2, wherein the step of restarting the DC/AC converter further comprises the step of:
   restarting a DC/AC output inverter of the DC/AC converter.

4. The method of claim 1, wherein the step of restarting the DC/AC converter further comprises the steps of:
   restarting a DC/DC converter of the DC/AC converter; and
   restarting a DC/AC output inverter of the DC/AC converter.

5. The method of claim 4, further comprising the step of:
   decreasing the commanded link voltage to the nominal link voltage level after a predetermined time period.

6. The method of claim 1, further comprising the step of:
   decreasing the commanded link voltage to the nominal link voltage level after a predetermined time period.

7. The method of claim 1, wherein the step of increasing the commanded link voltage to an increased link voltage level that is greater than the nominal link voltage level when the actual link voltage of the DC/AC converter falls below the predetermined link voltage level further comprises the step of:
   increasing the commanded link voltage to an increased link voltage level that is greater in magnitude than the nominal link voltage level for a predetermined time period when the actual link voltage of the DC/AC converter falls below the predetermined link voltage level.

8. A power system, comprising:
   a DC/AC converter;
   a processor coupled to the DC/AC converter; and
   a memory subsystem coupled to the processor, the memory subsystem storing code that when executed by the processor instructs the processor to perform the steps of:
   determining when an actual link voltage of a DC/AC converter falls below a predetermined link voltage level when a commanded link voltage is set for a nominal link voltage level;
   increasing the commanded link voltage to an increased link voltage level that is greater than the nominal link voltage level when the actual link voltage of the DC/AC converter falls below the predetermined link voltage; and
   restarting the DC/AC converter.

9. The system of claim 8, wherein the step of restarting the DC/AC converter further comprises the step of:
   restarting a DC/DC converter of the DC/AC converter.

10. The system of claim 9, wherein the step of restarting the DC/AC converter further comprises the step of:
    restarting a DC/AC output inverter of the DC/AC converter.

11. The system of claim 8, wherein the step of restarting the DC/AC converter further comprises the steps of:
    restarting a DC/DC converter of the DC/AC converter; and
    restarting a DC/AC output inverter of the DC/AC converter.

12. The system of claim 11, further comprising the step of:
    decreasing the commanded link voltage to the nominal link voltage level after a predetermined time period.

13. The system of claim 8, wherein the step of increasing the commanded link voltage to an increased link voltage level that is greater than the nominal link voltage level when the actual link voltage of the DC/AC converter falls below the predetermined link voltage level further comprises the step of:
    increasing the commanded link voltage to an increased link voltage level that is greater in magnitude than the nominal link voltage level for a predetermined time period when the actual link voltage of the DC/AC converter falls below the predetermined link voltage level.

14. A power system, comprising:
    a DC/AC converter;
    a decision circuit coupled to the DC/AC converter, wherein the decision circuit performs the steps of:
    determining when an actual link voltage of a DC/AC converter falls below a predetermined link voltage level when a commanded link voltage is set for a nominal link voltage level;
    increasing the commanded link voltage to an increased link voltage level that is greater than the nominal link voltage level when the actual link voltage of the DC/AC converter falls below the predetermined link voltage; and
    restarting the DC/AC converter.

15. The system of claim 14, wherein the step of restarting the DC/AC converter further comprises the step of:
    restarting a DC/DC converter of the DC/AC converter.

16. The system of claim 15, wherein the step of restarting the DC/AC converter further comprises the step of:
    restarting a DC/AC output inverter of the DC/AC converter.

17. The system of claim 14, wherein the step of restarting the DC/AC converter further comprises the steps of:
    restarting a DC/DC converter of the DC/AC converter; and
    restarting a DC/AC output inverter of the DC/AC converter.

18. The system of claim 17, further comprising the step of:
    decreasing the commanded link voltage to the nominal link voltage level after a predetermined time period.

19. The system of claim 14, wherein the step of increasing the commanded link voltage to an increased link voltage level that is greater than the nominal link voltage level when the actual link voltage of the DC/AC converter falls below the predetermined link voltage level further comprises the step of:
    increasing the commanded link voltage to an increased link voltage level that is greater in magnitude than the nominal link voltage level for a predetermined time period when the actual link voltage of the DC/AC converter falls below the predetermined link voltage level.

20. The system of claim 14, further comprising the step of:
    decreasing the commanded link voltage to the nominal link voltage level after a predetermined time period.

* * * * *